United States Patent
Li et al.

(10) Patent No.: US 11,533,121 B2
(45) Date of Patent: Dec. 20, 2022

(54) METHOD AND APPARATUS FOR PACKET WASH IN NETWORKS

(71) Applicant: Huawei Technologies Co., Ltd., Shenzhen (CN)

(72) Inventors: Renwei Li, Fremont, CA (US); Kiran Makhijani, Los Gatos, CA (US); Lijun Dong, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/206,524

(22) Filed: Mar. 19, 2021

(65) Prior Publication Data
US 2021/0211220 A1    Jul. 8, 2021

Related U.S. Application Data

(63) Continuation of application No. PCT/US2019/045991, filed on Aug. 9, 2019.
(Continued)

(51) Int. Cl.
*H04L 1/00* (2006.01)
*H04L 69/324* (2022.01)

(52) U.S. Cl.
CPC .......... *H04L 1/0007* (2013.01); *H04L 69/324* (2013.01)

(58) Field of Classification Search
None
See application file for complete search history.

(56) References Cited

U.S. PATENT DOCUMENTS

| | | | |
|---|---|---|---|
| 6,826,148 B1 * | 11/2004 | Lee | H04L 47/122 370/235 |
| 8,717,897 B2 | 5/2014 | Aboul-Magd et al. | |

(Continued)

FOREIGN PATENT DOCUMENTS

| | | |
|---|---|---|
| CN | 101931588 A | 12/2010 |
| CN | 102547844 A | 7/2012 |
| CN | 108600114 A | 9/2018 |

OTHER PUBLICATIONS

Huston, G., "Evaluating IPv4 and IPv6 Packet Fragmentation," Jan. 29, 2016, 12 pages.
(Continued)

*Primary Examiner* — Anh Vu H Ly
(74) *Attorney, Agent, or Firm* — Conley Rose, P.C.

(57) ABSTRACT

A method for communicating a data packet, the method includes receiving a data packet that supports a packet wash operation. The method determines whether the data packet can be forwarded along a network path towards a destination node without any modification. If the data packet cannot be forwarded along the network path towards the destination node without modification, the method determines whether conditions are met for performing the packet wash operation on the data packet. If the conditions are met, the packet wash operation is performed to generate a washed data packet. The packet wash operation generates the washed data packet by modifying a size of a payload of the data packet based on a packet wash specification that associates attributes to a plurality of data payload portions of the payload of the data packet. The washed data packet is forwarded along the network path towards the destination node.

23 Claims, 7 Drawing Sheets

Related U.S. Application Data

(60) Provisional application No. 62/739,736, filed on Oct. 1, 2018.

(56) References Cited

U.S. PATENT DOCUMENTS

| | | | |
|---|---|---|---|
| 2010/0135323 A1 | 6/2010 | Leong | |
| 2010/0322249 A1* | 12/2010 | Thathapudi | H04L 47/10 370/395.1 |
| 2012/0172672 A1 | 7/2012 | Pekarske et al. | |
| 2013/0124752 A1* | 5/2013 | Griffith | G06F 11/3093 709/235 |
| 2014/0369194 A1 | 12/2014 | Friedman et al. | |
| 2016/0099878 A1* | 4/2016 | Swartzentruber | H04L 49/00 370/230 |
| 2018/0337863 A1* | 11/2018 | Roberts | H04L 12/4633 |

OTHER PUBLICATIONS

Kambhatla, K., et al., "Wireless H.264 Video Quality Enhancement Through Optimal Prioritized Packet Fragmentation," IEEE Transactions on Multimedia, vol. 14, No. 5, Oct. 2012, 17 pages.

* cited by examiner

METHOD AND APPARATUS FOR PACKET WASH IN NETWORKS

CROSS-REFERENCE TO RELATED APPLICATIONS

This patent application is a continuation of International Application No. PCT/US2019/045991 filed on Aug. 9, 2019, by Futurewei Technologies, Inc., and titled "Method and Apparatus for Packet wash in Networks," which claims the benefit of U.S. Provisional Patent Application No. 62/739,736 filed Oct. 1, 2018 by Renwei Li, et al. and titled "Method and Apparatus for Packet wash in Networks," each of which is hereby incorporated in its entirety by reference.

TECHNICAL FIELD

The present disclosure is generally related to point cloud coding, and specifically to patch orientation derivation and prediction in the context of point cloud coding.

BACKGROUND

Communication systems are known to support wireless and wired communications between wireless and/or wired communication devices. Such communication systems range from national and/or international cellular telephone systems to the Internet to point-to-point in-home wireless networks to radio frequency identification (RFID) systems to radio frequency radar systems. Each type of communication system is constructed, and hence operates, in accordance with one or more communication standards. For instance, radio frequency (RF) wireless communication systems may operate in accordance with one or more standards including, but not limited to, RFID, Institute of Electrical and Electronics Engineers (IEEE) 802.11x, Bluetooth, global system for mobile communications (GSM), code division multiple access (CDMA), wideband code division multiple access (WCDMA), local multi-point distribution systems (LMDS), multi-channel-multi-point distribution systems (MMDS), Long-Term Evolution (LTE), worldwide interoperability for microwave access (WiMAX), and/or variations thereof.

Packetized communications between devices may be corrupted due to signal path problems, network loading, and/or by a number of other issues. Many packetized communications support confirmations of successful receipt of packets. When confirmation of successful receipt of a packet by a sending network node is not received, the packet is retransmitted by the sending network node until successful receipt is acknowledged or a maximum retransmission time is reached. Retransmission requirements waste network resources and increase communication latency.

SUMMARY

A first aspect relates to a method, performed by an intermediary network node, for communicating a data packet. The method includes receiving, by the intermediary network node, a data packet that supports a packet wash operation. The method determines whether the data packet can be forwarded along a network path towards a destination node without any modification. If the data packet cannot be forwarded along the network path towards the destination node without modification, the method determines whether conditions are met for performing the packet wash operation on the data packet. If the conditions are met for performing the packet wash operation on the data packet, the method performs the packet wash operation on the data packet to generate a washed data packet. The packet wash operation modifies a size of a payload of the data packet based on a packet wash specification that associates attributes to a plurality of data payload portions of the payload of the data packet. The washed data is forwarded along the network path towards the destination node.

In a first implementation form of the method according to the first aspect, if the data packet can be forwarded along a network path towards a destination node without any modification, the method forwards the data packet along the network path towards the destination node without any modification.

In a second implementation form of the first aspect as such or any preceding implementation form of the first aspect, if the data packet cannot be forwarded along the network path towards the destination node without any modification, and the conditions are not met for performing the packet wash operation on the data packet, the method requests retransmission of the data packet.

In a third implementation form of the first aspect as such or any preceding implementation form of the first aspect, the method provides an indication within the washed data packet that identifies data that was removed from the data packet to generate the wash data packet.

In a fourth implementation form of the first aspect as such or any preceding implementation form of the first aspect, the conditions include a network congestion level.

In a fifth implementation form of the first aspect as such or any preceding implementation form of the first aspect, the conditions include a transmission error.

In a sixth implementation form of the first aspect as such or any preceding implementation form of the first aspect, the conditions include a cyclic redundancy check (CRC) error.

In a seventh implementation form of the first aspect as such or any preceding implementation form of the first aspect, the conditions include a buffer threshold level.

In an eighth implementation form of the first aspect as such or any preceding implementation form of the first aspect, the conditions include the data packet exceeding a Maximum Transmission Unit (MTU) of the network node, wherein the packet wash operation drops insignificant bytes from the data packet to generate the washed data packet, and the washed data packet is within the MTU of the network node.

In a ninth implementation form of the first aspect as such or any preceding implementation form of the first aspect, the attributes for a data payload portion include a priority level of the data payload portion.

In a tenth implementation form of the first aspect as such or any preceding implementation form of the first aspect, the attributes for a data payload portion include a binary value indicating whether the data payload portion can be dropped by the packet wash operation.

In a eleventh implementation form of the first aspect as such or any preceding implementation form of the first aspect, the packet wash operation reduces a size of the data packet by removing at least one data payload portion from the payload of data packet, wherein the at least one data payload portion is selected for removal based on the attributes assigned to the plurality of data payload portions of the data packet.

In a twelfth implementation form of the first aspect as such or any preceding implementation form of the first aspect, the packet wash operation increases a size of the data packet by restoring at least one data payload portion from the payload of data packet that was previously removed by a prior intermediate network node along the forwarding path.

A second aspect relates to a method, performed by a source network node, for communicating a data packet. The method includes determining, by the source node, whether information can be broken down and packed with different attributes into a payload of a data packet. The method creates a packet wash operation specification that specifies details for breaking the information into a plurality of data payload portions, the packet wash operation specification associates particular attributes with each data payload portion. The method indicates in the data packet that the data packet supports a packet wash operation that modifies a size of the payload of the data packet based on the particular attributes associated the plurality of data payload portions. The method transmits the data packet along a network path towards a destination node.

In a first implementation form of the method according to the second aspect, the packet wash specification is created by an application executing on the source node.

In a second implementation form of the second aspect as such or any preceding implementation form of the second aspect, the method passes, using an application programming interface (API), the packet wash specification from the application to a network stack of the source node for enabling the network stack to create the data packet comprising the plurality of data payload portions based on the packet wash specification.

In a third implementation form of the second aspect as such or any preceding implementation form of the second aspect, the particular attributes for a data payload portion include a priority level of the data payload portion.

In a fourth implementation form of the second aspect as such or any preceding implementation form of the second aspect, the method provides conditions to intermediary network nodes that specify when the intermediary network nodes can perform the packet wash operation on the data packet.

In a fifth implementation form of the second aspect as such or any preceding implementation form of the second aspect, the method performs encryption on each individual data payload portion of the data packet.

In a sixth implementation form of the second aspect as such or any preceding implementation form of the second aspect, the method performs a cyclic redundancy check (CRC) on each individual data payload portion of the data packet.

In a seventh implementation form of the second aspect as such or any preceding implementation form of the second aspect, the method provides an offset of each data payload portion of the data packet.

In an eighth implementation form of the second aspect as such or any preceding implementation form of the second aspect, the conditions that specify when intermediary network nodes can perform the packet wash operation on the data packet include a network congestion level.

In a ninth implementation form of the second aspect as such or any preceding implementation form of the second aspect, the conditions that specify when intermediary network nodes can perform the packet wash operation on the data packet include a buffer threshold level.

In a tenth implementation form of the second aspect as such or any preceding implementation form of the second aspect, wherein the packet wash operation reduces a size of the data packet by removing at least one data payload portion of information from the data packet, wherein the at least one data payload portion of information selected for removal is based on the particular attributes assigned to the plurality of data payload portions of the data packets.

In a eleventh implementation form of the second aspect as such or any preceding implementation form of the second aspect, the method receives a request to retransmit the data packet only in response to the data packet missing a data payload portion of information that is categorized as being significant.

In a twelfth implementation form of the second aspect as such or any preceding implementation form of the second aspect, the method indicates that the data packet supports the packet wash operation by inserting the packet wash specification into the data packet.

A third aspect relates to a method perform by a destination node. The method includes receiving a data packet that supports the packet wash operation. The method extracts a payload and a packet wash specification from the packet. The method determines whether the packet wash operation was performed on the data packet by an intermediary network node using the packet wash specification.

In a first implementation form of the method according to the third aspect, the method determines whether to request retransmission of the data packet based on the extracted payload and the packet wash specification.

In a second implementation form of the third aspect as such or any preceding implementation form of the third aspect, the method transmits a request to a source node to retransmit the data packet only in response to a determination that the data packet is missing a data payload portion that is categorized as being significant.

A fourth aspect relates to an apparatus comprising memory and a processor configured to execute instructions for implementing any preceding aspect as such or any preceding implementation form of any preceding aspect.

For the purpose of clarity, any one of the foregoing implementation forms may be combined with any one or more of the other foregoing implementations to create a new embodiment within the scope of the present disclosure. These embodiments and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The present disclosure provides various embodiments for reducing the need for packet retransmission. In particular, the present disclosure describes a packet wash operation, which enables intermediary routers or network nodes to modifying a size of a data packet en route by dropping insignificant data payload portions of the payload of the data packet, or by adding or restoring a data payload portion to the payload of the data packet. The latency of packet delivery can be significantly reduced due to the absence of re-transmissions, and smaller packet size after partial payload drops. Additional benefits of the disclosed embodiments can be ascertained from the following description.

Figure 1:
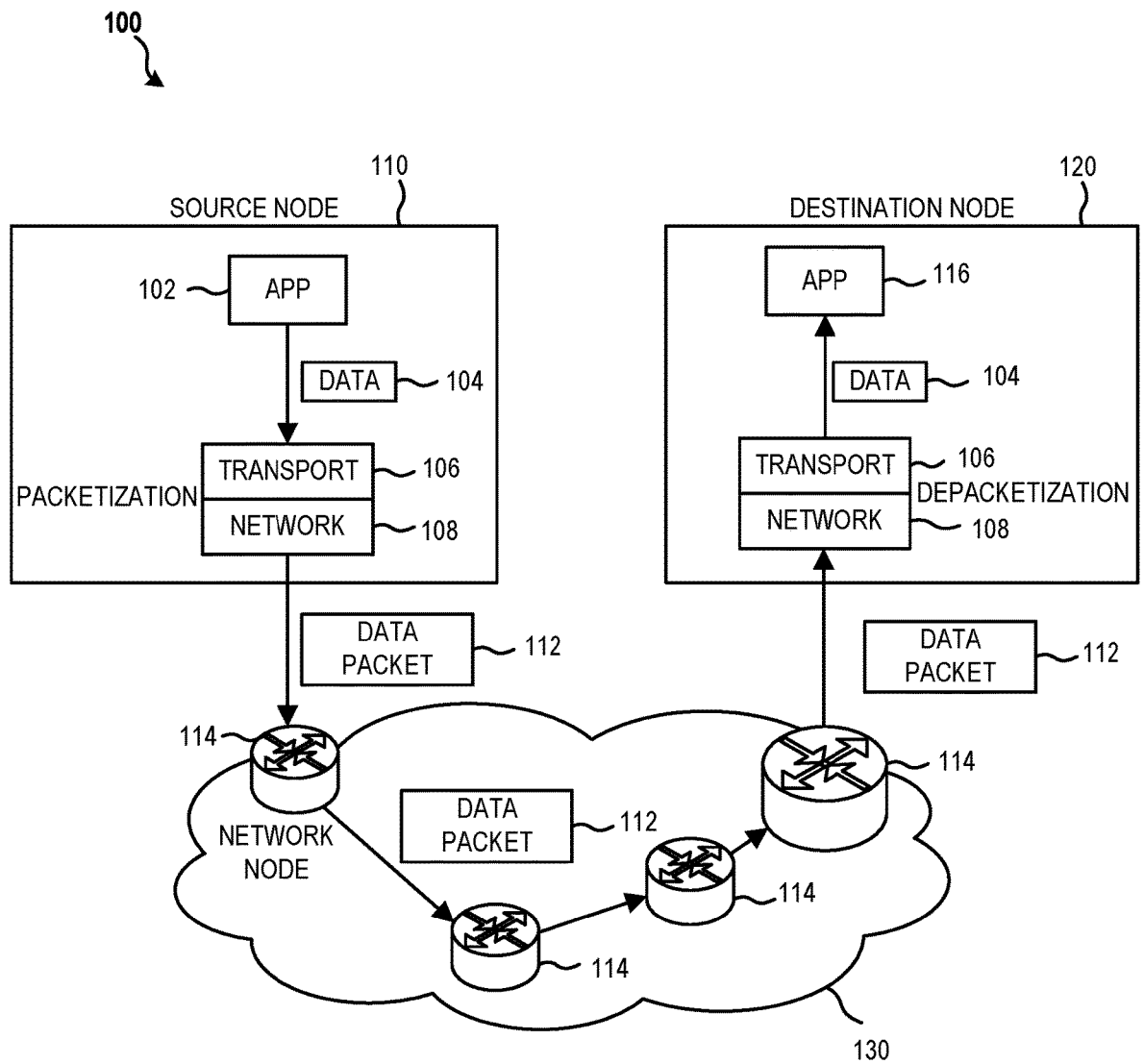
FIG. 1 is a schematic diagram illustrating a communication network.

FIG. 1 is a schematic diagram illustrating a process 100 for communicating data between a source node 110 and a destination node 120 over a communication network 130. The source node 110 and destination node 120 can be any type of electronic device capable of communicating over the communication network 130 such as, but not limited to, a mobile communication device, an Internet of things (IoT) device, a personal computer, a server, a router, a mainframe, a database, or any other type of user or network device. For example, the source node 110 can be a media server, and the destination node 120 can be a mobile device that receives media content from the source node 110.

In the depicted embodiment, the source node 110 executes one or more programs/applications (APP) 102. The application 102 can be any type of software application. The application 102 produces or generates data 104. Data 104 can be any type of data depending on the functions of the application 102. The data 104 can be data that is automatically produced and pushed by the source node 110 to the destination node 120. Alternatively, the data 104 can be data that is specifically requested from the source node 110 by the destination node 120. To communicate the data 104 to the destination node 120, the application 102 on the source node 110 uses an application programming interface (API) to communicate the data 104 to a transport layer 106 of the source node 110. The transport layer 106 is responsible for delivering the data 104 to the appropriate application 116 on the destination node 120. The transport layer 106 bundles/organizes the data into data packets 112 according to a specific protocol (i.e., packetization). For instance, the transport layer 106 may use various communication protocols such as, but not limited to, Transmission Control Protocol/Internet protocol (TCP/IP) for providing host-to-host communication services such as connection-oriented communication, reliability, flow control, and multiplexing.

The data packets 112 are transferred to a network layer 108 of the source node 110. The network layer 108 is responsible for packet forwarding including routing of the data packets 112 through one or intermediate routers or network nodes 114 of the communication network 130. The communication network 130 can comprise multiple interconnected networks including a local area network (LAN), metropolitan area network (MAN), wide area network (WAN), a wireless or mobile network, and an inter-network (e.g., the Internet). When the data packets 112 reach the destination node 120, data 104 is extracted from the data packets 112 (i.e., depacketized) and passed to the application 116 on the destination node 120.

Figure 2:
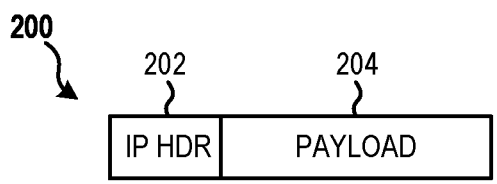
FIG. 2 is a schematic diagram illustrating a data packet.

FIG. 2 is a schematic diagram illustrating an example of a data packet 200 that can be communicated over the communication network 130 of FIG. 1. The data packet 200 is similar to the data packet 112 of FIG. 1. The data packet 200 includes an Internet protocol (IP) header (IP HDR) 202 and a payload 204. The IP HDR 202 contains routing information and information (e.g., an identification tag) that enables the data packets 200 to be reassembled after transmission to produce the data 104. For instance, IP networks, such as the Internet, are normally not secure, so the data packet 200 can be lost, can be delayed, and can arrive in the wrong order. The identification tag helps to identify the data packet 200 and to reassemble the data 104 back to its original form. The IP HDR 202 can also contain a checksum and a time to live (TTL) value. The checksum is used for error detection and correction during packet transmission. The TTL value is used to reduce redundant packets in the communication network 130. The payload 204 of the data packet 200 contains the actual data being carried by the data packet 200.

Currently, within the communication network 130 (e.g., the Internet) packet forwarding is performed based on quality of service (QoS) techniques. The QoS function ensures that data packets 200 that are marked with higher priority are scheduled earlier than data packets 200 that are marked with lower or normal priorities. As a consequence, if outgoing buffers or queues of a network node 114 are full, the lower priority data packets 200 get completely dropped. Any error, due to link congestion or intermittent packet loss in the communication network 130, can trigger re-transmission of the data packets 200. Re-transmission of the data packets 200 wastes network resources, reduces the overall throughput of the connection, and causes longer latency for the packet delivery. Not only does the re-transmitted packet have to travel part of the routing path twice, but the source node 110 would not realize the data packets 200 have been dropped until one of the above three scenarios happens, which also adds to the extended waiting time at the source node 110 before the re-transmission is initiated. The result is that there can be unpredictable delays in the destination node 120 receiving the data packets 200, a significant increase in the network load of the communication network 130, and network resources/capacity waste. Emerging network applications, such as holographic telepresence, tactile Internet, etc. require extremely low latency. Thus, the current way of handling the packet error or network congestion by discarding the data packet 200 entirely is not optimal.

To alleviate the above problem, the disclosed embodiments introduce a packet wash operation into the communication network 130. The packet wash operation is a function performed by a network node 114 to modify a size of a data packet by removing a discardable data payload portion or data payload portions of the data (e.g., least-significant bytes) from the packet payload, or by adding or restoring a data payload portion of the data from the packet payload, while the data packet is en route from a source node to a destination node. A discardable data payload portion a is data within the payload that has been flagged or identified as being less significant, not required, and/or data that can be recovered from the payload of other data packets (e.g., redundant data such as color or a background image). With the proper packetization methods as described herein, the network nodes 114 may be able to understand the importance/significance/relationship of each byte in the data packet. Thus, based on the current network condition such as, but not limited to, congestion level, queue length, urgency of the data packet (which may be indicated the metadata of the data packet), the network nodes 114 can decide which byte(s) in the data packet can be dropped while keeping as much of data as possible.

Figure 3:
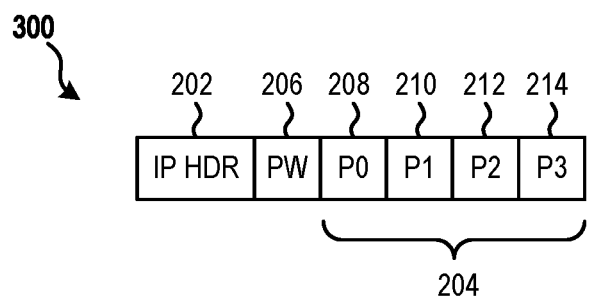
FIG. 3 is a schematic diagram illustrating a data packet that supports a packet wash operation in accordance with an embodiment of the present disclosure.

FIG. 3 is a schematic diagram illustrating a data packet 300 that supports a packet wash operation in accordance with an embodiment of the present disclosure. The data packet 300 includes the IP HDR 202, a packet wash (PW) specification 206, and the payload 204. In an embodiment, the source node 110 creates the PW specification 206. The PW specification 206 describes the significance of the bytes or data payload portions of the payload 204. During the packetization process, the source node 110 breaks the data into a plurality of data payload portions (i.e., smaller pieces of data). For example, in the depicted embodiment, the data payload for the data packet 300 is broken into data payload portion (P0) 208, data payload portion (P1) 210, data payload portion (P2) 212, and data payload portion (P3) 214 based on the PW specification 206. The number of data payload portions that the payload 204 has may vary depending on the level of granularity applied to the significance of the bytes. Each data payload portion is associated with particular attributes such as, but not limited to, a priority level or significance value of the data payload portion. In some embodiments, a binary value (e.g., 0 or 1) can be assigned to each data payload portion indicating whether the data payload portion is significant/required or insignificant/disposable. Alternatively, each data payload portion can be assigned a value within a range (e.g., 0-9) to provide greater granularity of the significance or priority level of a data payload portion of data. The data payload portions of data may vary in size (i.e., contain more information than other data payload portions). In an embodiment, the network node 114 performs the packet wash operation by dropping lower-priority data payload portions from the payload 204 of the data packet 300 according to the information in the PW specification 206 while retaining as much information as possible based on the current network condition. As a non-limiting example for video streaming, the source node 110 could rearrange the bits in the payload 204 such that the first consecutive data payload portions contain the base layer that encodes the basic video quality, while the next consecutive data payload portions contain the enhancement layers (e.g., higher signal-to-noise ratio, higher resolution, and higher frame rate). If congestion or other satisfying network condition occurs, a forwarding network node 114 can intentionally remove as many of the data payload portions containing the enhancement layers as necessary without having to request that the data packet 300 be retransmitted by the source node 110. Additionally, the data payload portions in the packet payload 204 may have a certain relationship among each other. For example, a network coding scheme can be applied where the data payload portions are linearly coded from the original data payload portions in the payload and are linearly independent from each other. In this embodiment, dropping any of the linearly coded data payload portions and keeping the rest of the data payload portions would still enable the receiver to recover the original data contained in the packet payload.

Figure 4:
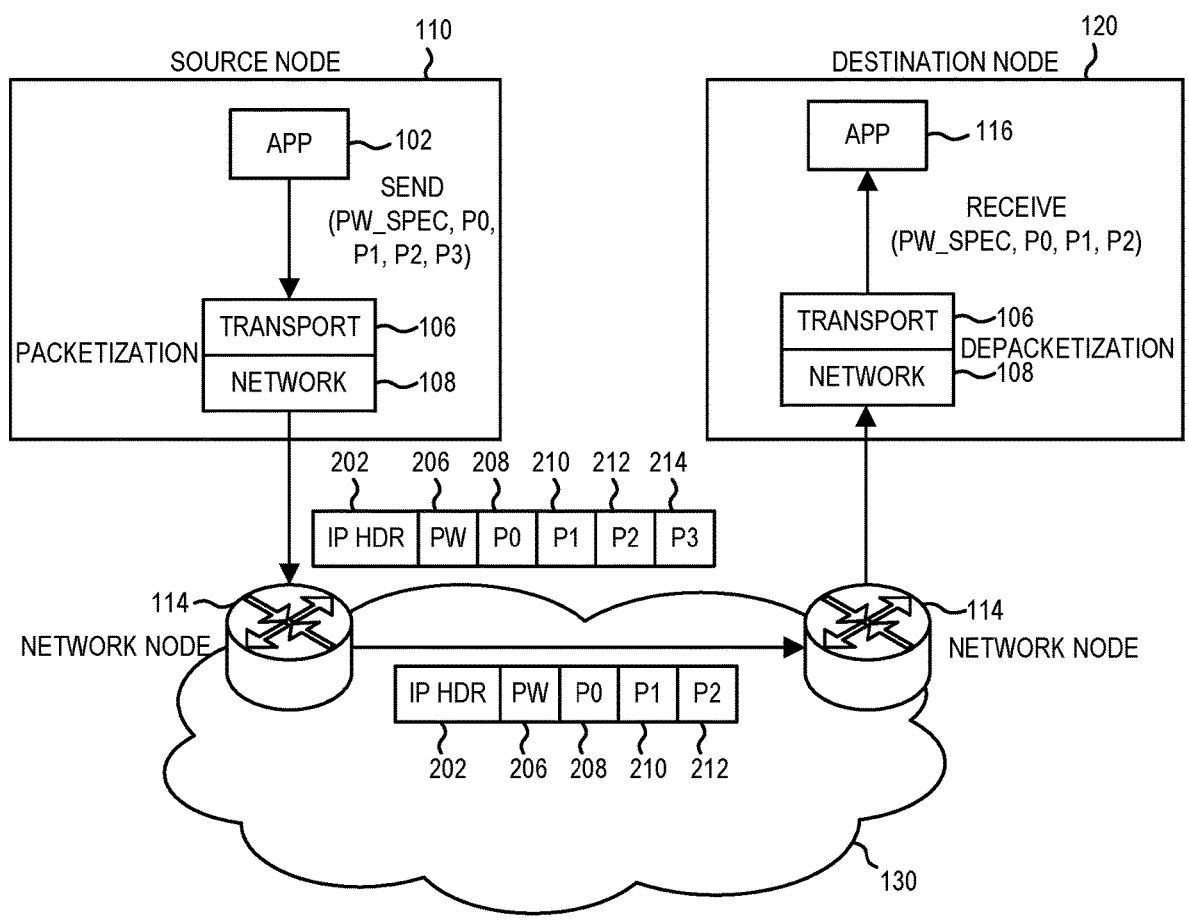
FIG. 4 is a schematic diagram illustrating a packet wash operation in accordance with an embodiment of the present disclosure.

FIG. 4 is a schematic diagram illustrating a packet wash operation in accordance with an embodiment of the present disclosure. In the depicted embodiment, the application 102 on the source node 110 creates the packet wash operation specification that specifies that the data for the packet can be split into four data payload portions of data (P0, P1, P2, and P3). The packet wash operation specification can also provide attributes and conditions associated with each of the data payload portions of data. The attributes indicate the level of significance for each of the data payload portions of data. The attributes can also indicate the type of information contained in each of the data payload portions of data. The conditions specify when the packet wash operation can occur. The conditions may also specify when packet retransmission should be requested. The data and the packet wash operation specification are passed to the transport layer 106 for packetization. The transport layer 106 creates a data packet based on the packet wash operation specification. In an embodiment, the data packet may include a flag or a packet wash operation field to indicate that the data packet supports the packet washes operation. Alternatively, the inclusion of a packet wash operation specification in the data packet indicates that the data packet supports the packet wash operation. The packet wash supported data packet (e.g., data packet 300) is passed to the network layer 106, which transmits the data packet to the destination node 120 over the communication network 130. When the intermediate routers (e.g., network node 114) on the communication network 130 receives the packet wash supported data packet, if the network conditions are normal, the network node 114 will forward the packet wash supported data packet just like a normal data packet (i.e., a non-packet wash supported data packet). However, if network conditions at the network node 114 do not enable the packet wash supported data packet to be forwarded without modification, the network node 114 will perform the packet wash operation based on the packet wash operation specification of the data packet if the conditions for performing the packet wash operation are met. For example, in the depicted embodiment, based on the network condition and the packet wash operation specification, the network node 114 removes the data payload portion (P3) 214 from the data packet and forwards the remaining data packet towards the destination node 120. In some embodiments, a new washed data packet may be generated with the remaining data payload portions of the data packet and the original data packet may be discarded. Alternatively, in some embodiments, one or more data payload portions of data are removed from the original data packet, and the remaining data payload portions of the original data packet are forwarded. However, if the conditions for performing the packet wash operation are not met and the network conditions do not support forwarding the data packet, the network node 114 will drop the data packet and send a request to the source node 110 for retransmission of the data packet. When the data packet arrives at the destination node 120, the data packet is depacketized, and the packet wash operation specification and the data are passed to the application 116. In some embodiments, the application 116 can utilize the packet wash operation specification to determine if the data has been packet washed and the type of data that was removed. The application 116 may provide a user some indication or notification regarding the data that was not received. Thus, the data that is received at the destination node 120 is not required to be exactly the same as what is sent by the source node 110. However, the received partial or degraded data is still useful to the application 116. For example, if the dropped data is enhancement layers, the video can still be displayed in basic form. In some embodiments, the discarded data can be recovered from data received from prior data packets. For example, if the application 116 determines that the discarded data corresponds to a background color or other item (e.g., color of a car) or corresponds to an image that was previously received (e.g., a page of slide presentation that has not changed since the last packet), the application 116 can recover the discarded data by using the data from previous packets. Thus, in some embodiments, the data that is received may be repaired and recovered prior to being rendered.

Figure 5:
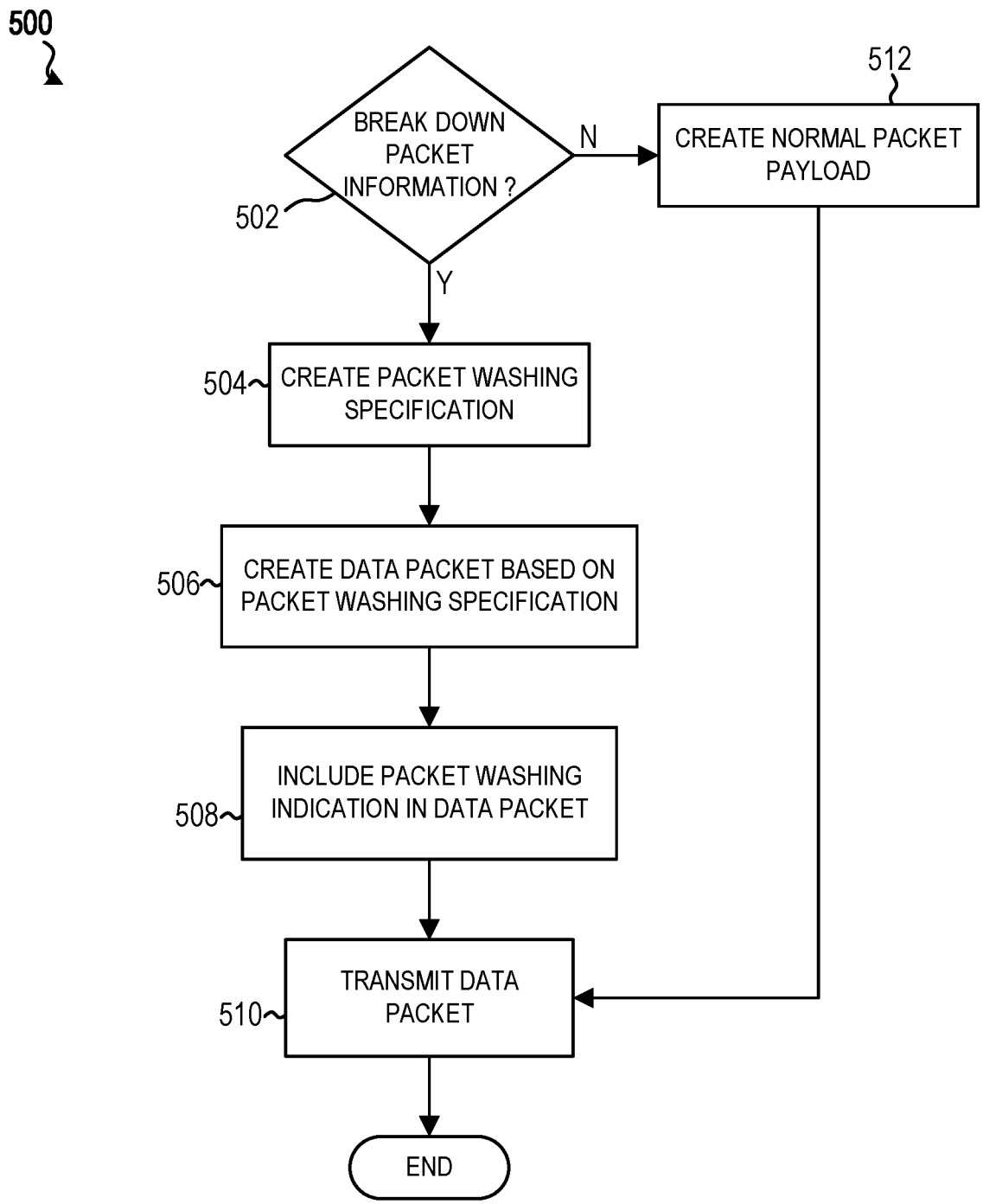
FIG. 5 is a flowchart illustrating a process performed by a source node for communicating a data packet that supports a packet wash operation in accordance with an embodiment of the present disclosure.

FIG. 5 is a flowchart illustrating a process 500 performed by a source node for communicating a data packet that supports a packet wash operation in accordance with an embodiment of the present disclosure. The process 500, at step 502, begins by determining whether information/data can be broken down and packed with different attributes into a data packet. If the information cannot be broken down and packed with different attributes into a data packet, the process 500, at step 512, will create a normal/regular data packet that will get transmitted towards the destination node at step 510. However, if the data can be broken down and packed with different attributes into a data packet, the process 500, at step 504, creates a packet wash operation specification that specifies details for breaking the information into a plurality of data payload portions. Each data payload portion is associated with particular attributes and can also be associated with certain network conditions. At step 506, the process 500 creates the data packet comprising the plurality of data payload portions based on the specification. In various embodiments, process 500 may perform a cyclic redundancy check (CRC) and encryption on each individual data payload portion of the data packet. CRC is an error-detecting code that detects accidental changes to raw computer data commonly used in digital telecommunications networks. Encryption prevents devices other than the intended destination node 120 from being able to recover the data in the individual data payload portions of data. The process 500 may also provide an offset of each data payload portion to indicate the beginning of each data payload portion of data in the packet. The process 500, at step 508, includes an indication in the data packet that the packet wash operation is supported. The indication may be a flag/field within the packet. Alternatively, the packet wash operation specification may be included in the data packet to indicate that the data packet supports the packet wash operation. At step 510, the process 500 transmits the data packet along a network path towards the destination node of the data packet, with process 500 terminating thereafter.

Figure 6:
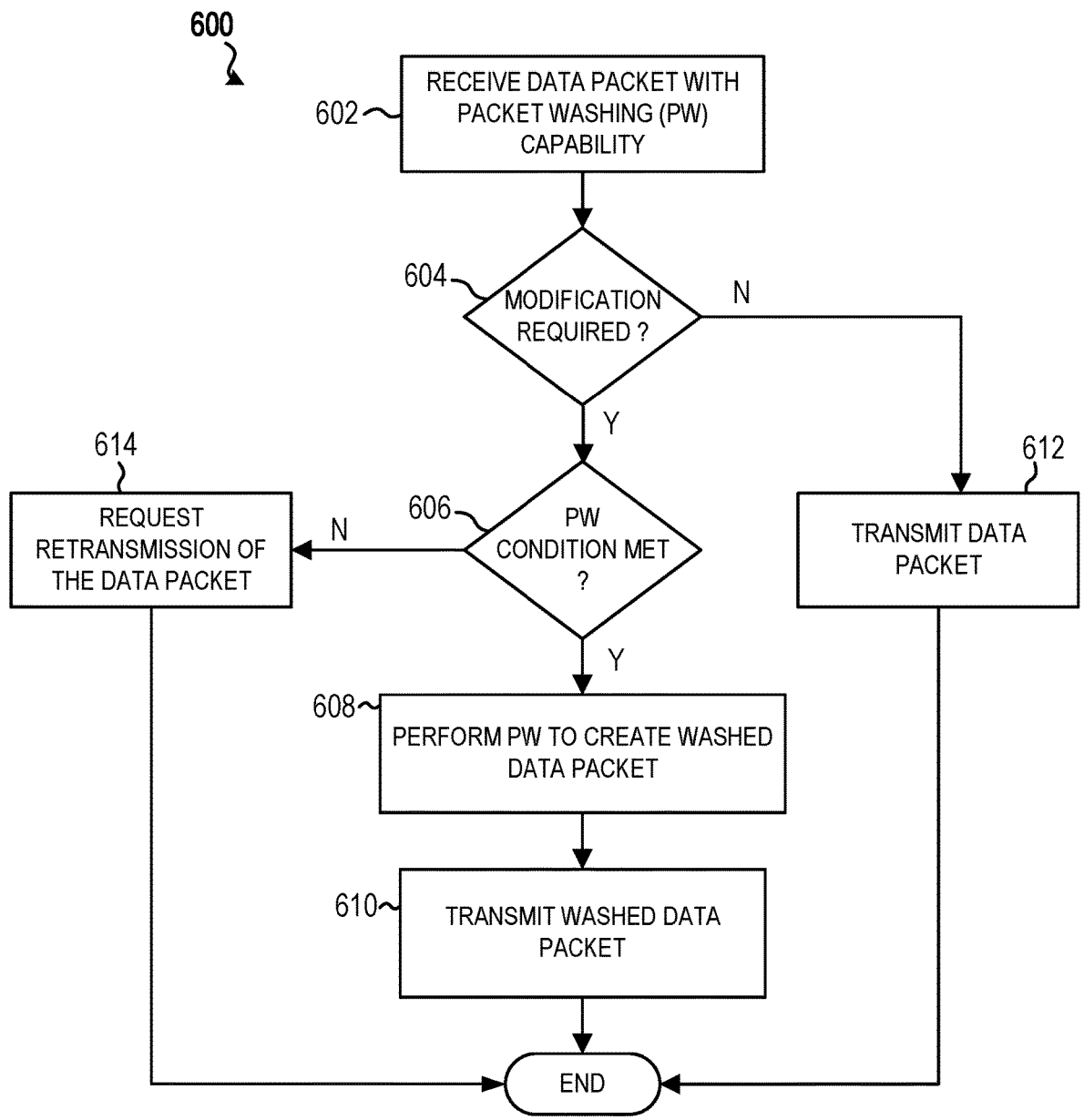
FIG. 6 is a flowchart illustrating a process performed by a network node for communicating a data packet that supports a packet wash operation in accordance with an embodiment of the present disclosure.

FIG. 6 is a flowchart illustrating a process 600 performed by a network node for communicating a data packet that supports a packet wash operation in accordance with an embodiment of the present disclosure. The process 600, at step 602, begins by receiving a data packet that includes an indication that the packet wash operation can be applied to the data packet. At step 604, the process 600 determines whether the data packet can be forwarded without any modification. If the data packet can be forwarded without any modification, the process 600, at step 612, forwards the packet along the network path towards the destination node. However, if the process 600 determines that the data packet cannot be forwarded without being modified, process 600, at step 606, determines whether the conditions are met for performing the packet wash operation on the data packet.

The conditions for performing the packet wash operation may be predetermined by the network node, a domain controller, or may be specified within the data packet. The conditions can include network congestion, insufficient buffer, and/or data packet exceeding a maximum transmission unit (MTU) of the network node 114. The MTU is the size of the largest protocol data unit that can be communicated in a single network layer transaction. If the data packet exceeds the MTU, the network node 114 drops the insignificant data from the data packet to generate a washed data packet within the MTU of the network node 114. For instance, if the data packet arrives with n number of bytes and network node 114 can only queue n-m bytes, the packet wash operation checks if it is okay to drop m bytes and, if so, queues the remaining n-m bytes. In some embodiments, the network node 114 may mark some bits to indicate what was dropped from the data packet for the receiver. The washed data packet is forwarded as normal with any change to the IP header.

If the network conditions are not met for performing the packet wash operation on the data packet and the data packet cannot be forwarded without modification, the process 600, at step 614, sends a request for retransmission of the data packet to the source node. If the process 600 determines that the conditions are met for performing the packet wash operation on the data packet, the process 600, at step 608, performs the packet wash operation on the data packet to generate a washed data packet as described herein. At step 610, process 600 forwards/transmits the washed data packet along the network path towards the destination node, with process 600 terminating thereafter.

It should be noted that the process 600 may be repeated by each intermediate network node 114 that receives the data packet containing the packet wash specification even if an earlier intermediate network node 114 performed the packet wash operation on the data packet. In other words, a data packet can undergo packet washing more than once if necessary by different intermediate network nodes 114 along the network path towards the destination node 120. For instance, a first network node 114 may remove a first least significant data payload portion from a data packet based on the conditions of the first network node 114 and forward the washed data packet. A second network node 114 along the network path towards the destination node 120 can receive the washed data packet, and if necessary based on the conditions of the second network node 114, remove a second least significant data payload portion from the data packet and forward the new washed data packet along the network path towards the destination node 120. A third network node 114 along the network path towards the destination node 120 can receive the washed data packet, and if possible based on the conditions of the third network node 114, restore or add a data payload portion that was previously removed from the data packet and forward the new washed data packet along the network path towards the destination node 120. This process can be repeated as long as the data packet contains data that is indicated by the packet wash specification as being discardable.

Figure 7:
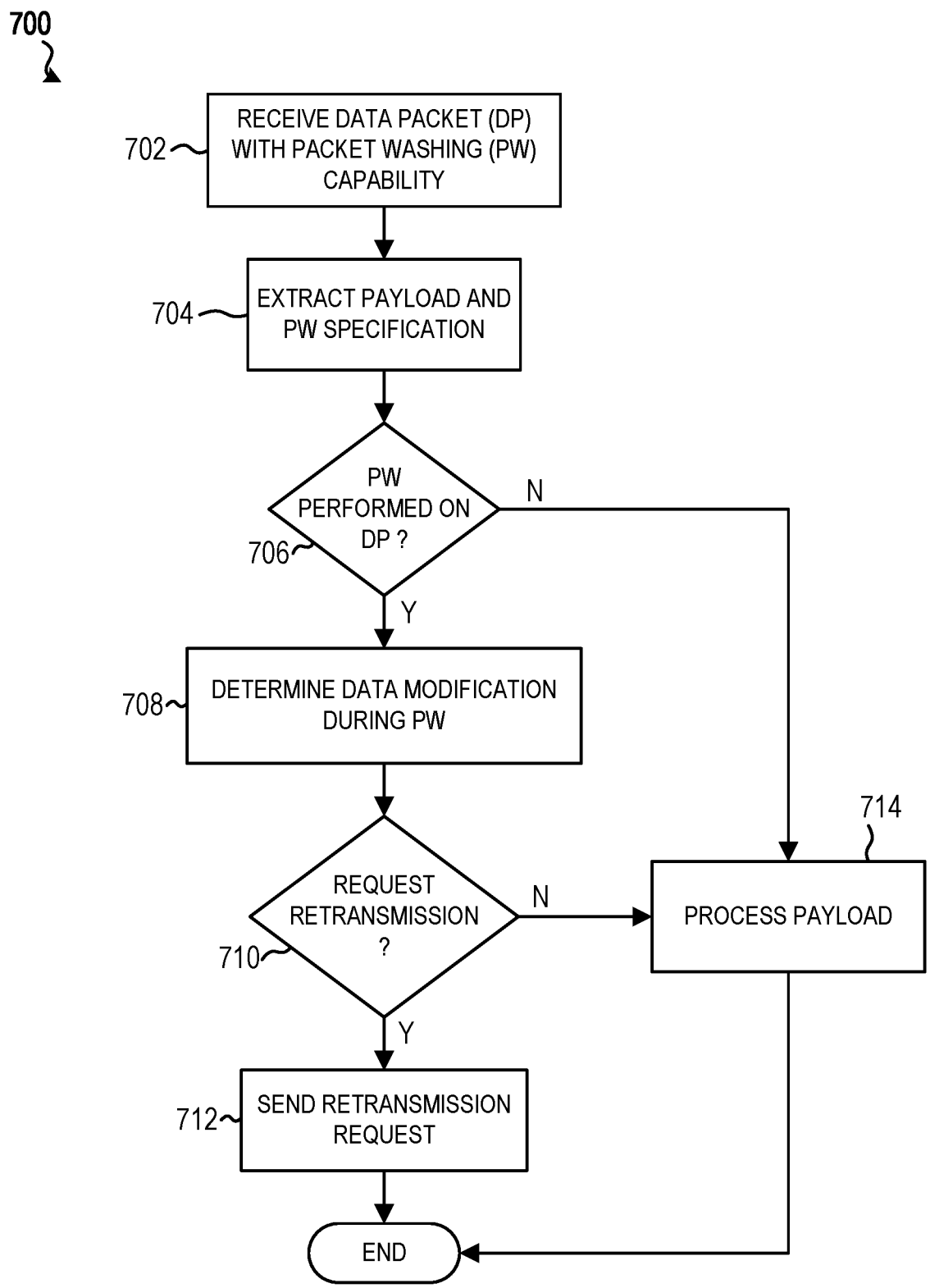
FIG. 7 is a flowchart illustrating a process performed by a destination node when receiving a data packet that supports a packet wash operation in accordance with an embodiment of the present disclosure.

FIG. 7 is a flowchart illustrating a process 700 performed by a destination node when receiving a data packet that supports a packet wash operation in accordance with an embodiment of the present disclosure. The process 700, at step 702, begins by receiving a data packet that includes an indication that the packet wash operation can be applied to the data packet. At step 704, the process 700 extracts the payload from the data packet and the packet wash specification from the received data packet. At step 706, the process 700 determines whether the packet wash operation was performed on the received data packet. If the packet wash operation was not performed on the received data packet, the process 700 performs the normal processing of the payload of the data packet. In an embodiment, if the packet wash operation was performed on the received data packet, the process 700, at step 708, determines the data modification that was performed by the packet wash operation based on the packet wash specification. Based on the data that was modified during the packet wash operation, the process 700, at step 710, may decide to request retransmission of the original data packet at step 712. Otherwise, the process 700 processes the received payload of the washed data packet at step 714, with process 700 terminating thereafter.

Figure 8:
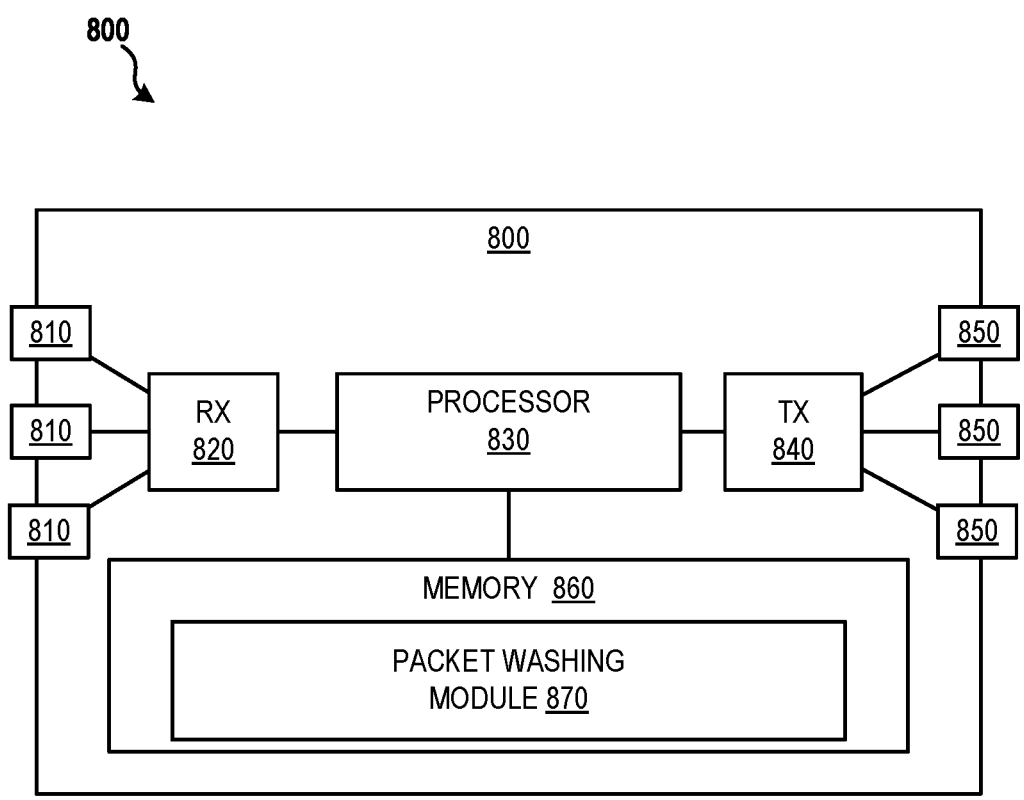
FIG. 8 is a schematic diagram of a node device in accordance with an embodiment of the present disclosure.

FIG. 8 is a schematic architecture diagram of an apparatus 800 according to an embodiment of the disclosure. The apparatus 800 is suitable for implementing the disclosed embodiments as described herein. For example, in an embodiment, the source node 110, destination node 120, or network node 114 can be implemented using the apparatus 800. In various embodiments, the apparatus 800 can be deployed as a router, a switch, and/or a controller within a network.

The apparatus 800 comprises receiver units (Rx) 820 or receiving means for receiving data via ingress ports 810; a processor 830, logic unit, central processing unit (CPU) or other processing means to process instructions; transmitter units (TX) 840 or transmitting means for transmitting via data egress ports 850; and a memory 860 or data storing means for storing the instructions and various data.

The processor 830 may be implemented as one or more CPU chips, cores (e.g., as a multi-core processor), field-programmable gate arrays (FPGAs), application specific integrated circuits (ASICs), and digital signal processors (DSPs). The processor 830 is communicatively coupled via a system bus with the ingress ports 810, RX 820, TX 840, egress ports 850, and memory 860. The processor 830 can be configured to execute instructions stored in memory 860. Thus, the processor 830 provides a means for determining, creating, indicating, performing, providing, or any other action corresponding to the claims when the appropriate instruction is executed by the processor.

The memory 860 can be any type of memory or component capable of storing data and/or instructions. For example, the memory 860 may be volatile and/or non-volatile memory such as read-only memory (ROM), random access memory (RAM), ternary content-addressable memory (TCAM), and/or static random-access memory (SRAM). The memory 860 can also include one or more disks, tape drives, and solid-state drives and may be used as an over-flow data storage device, to store programs when such programs are selected for execution, and to store instructions and data that are read during program execution. In some embodiments, the memory 860 can be memory that is integrated with the processor 830.

In one embodiment, the memory 860 stores a packet wash operation module 870. The packet wash operation module 870 includes data and executable instructions for implementing the disclosed embodiments. For instance, the packet wash operation module 870 can include instructions for implementing the methods as described herein. The inclusion of the packet wash operation module 870 substantially improves the functionality of the apparatus 800 by enabling packet wash capabilities to increase the networking efficiency of the apparatus 800.

Accordingly, the disclosed embodiments provide various systems and methods that enable a packet wash operation. Some benefits afforded by the embodiments described in this disclosure include reducing the need for packet transmission because the destination node/receiver has the capability or intelligence to comprehend the remaining data in the packet after removal of certain data payload portions from the payload by the intermediate network nodes. Additionally, while the received data is incomplete, the missing data is not so significant as to render the received data useless. In an embodiment, the destination node/receiver can acknowledge the acceptance of the packet, and also indicate to the sender that it was partially dropped in the network. In some cases, the destination node can indicate to the sender the particular information that was dropped by the network. Thus, by using the packet wash operation as disclosed herein, network resource usage can be tremendously reduced and better prioritized for the delivery of other packets. The latency of packet delivery can be significantly reduced due to the absence of re-transmissions, and smaller packet size after partial payload drops. Additionally, in some embodiments, the information contained in the original packet can be recovered by the receiving node, given the algorithms or methods are agreed and known in advance by the forwarding nodes and the receiver. The disclosed embodiments can be deployed in any type of a networking device including routers, switches, and network controllers, which are used by the service providers globally.

The disclosed embodiments may be a system, an apparatus, a method, and/or a computer program product at any possible technical detail level of integration. The computer program product may include a computer readable storage medium (or media) having computer readable program instructions thereon for causing a processor to carry out aspects of the present disclosure. The computer readable storage medium may be a tangible device that can retain and store instructions for use by an instruction execution device.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method, performed by an intermediary network node, for communicating a data packet, the method comprising:
   receiving, by the intermediary network node, the data packet;
   determining that one or more network conditions require a reduction in a size of the data packet; and modifying, by the intermediary network node, in response to determining that the one or more network conditions require the reduction in the size of the data packet, a payload of the data packet based on a packet modification specification to generate a modified data packet, wherein the packet modification specification assigns attributes to a plurality of data payload portions of the payload of the data packet, and forwarding the modified data packet along a network path towards a destination node.

2. The method of claim 1, further comprising providing an indication within the modified data packet that identifies data that was removed from the data packet to generate the modified data packet.

3. The method of claim 1, wherein the determining that the one or more network conditions require the reduction in the size of the data packet comprises determining a network condition including at least one of a network congestion level, a transmission error, a buffer threshold level, and a cyclic redundancy check (CRC) error.

4. The method of claim 1, wherein the determining that the one or more network conditions require the reduction in the size of the data packet comprises determining that the data packet exceeds a Maximum Transmission Unit (MTU) of the intermediary network node, wherein the intermediary network node drops insignificant bytes from the data packet to generate the modified data packet, and wherein the modified data packet is within the MTU of the intermediary network node.

5. The method of claim 1, wherein the attributes for a data payload portion of the data packet include a priority level of the data payload portion.

6. The method of claim 1, wherein the attributes for a data payload portion of the data packet include a binary value indicating whether the data payload portion can be dropped by the intermediary network node.

7. The method of claim 1, wherein the intermediary network node reduces the size of the data packet by removing at least one data payload portion from the payload of the data packet, wherein the at least one data payload portion is selected for removal based on the attributes assigned to the plurality of data payload portions of the data packet.

8. The method of claim 1, further comprising:
receiving, by the intermediary network node, a second data packet;
determining, by the intermediary network node, that the size of the second data packet can be increased;
determining, by the intermediary network node, that at least one data payload portion from the payload of the second data packet was previously removed by a prior intermediary network node along the network path; and
restoring, by the intermediary network node, the at least one data payload portion from the payload of the second data packet that was previously removed by the prior intermediary network node along the network path in response to determining that the size of the second data packet can be increased.

9. The method of claim 1, further comprising:
forwarding a third data packet along the network path towards the destination node without any modification when the intermediary network node determines that the one or more network conditions do not require modification of the data packet.

10. The method of claim 1, further comprising:
requesting, by the intermediary network node, retransmission of the data packet when the network conditions are not met for modifying the data packet and when the data packet cannot be forwarded along the network path towards the destination node without being modified by the intermediary network node.

11. A method, performed by a source node, for communicating a data packet, the method comprising:
generating, by the source node, the data packet having a payload comprising a plurality of data payload portions, wherein the data payload portions of the data packet are assigned particular attributes based on a packet modification specification associated with the data packet;
indicating, by the source node, in the data packet that the data packet supports a packet modification operation that modifies a size of the payload of the data packet based on the particular attributes assigned to the plurality of data payload portions; and
transmitting, by the source node, the data packet along a network path towards a destination node.

12. The method of claim 11, wherein the packet modification specification is created by an application executing on the source node.

13. The method of claim 12, further comprising passing, using an application programming interface (API), the packet modification specification from the application to a network stack of the source node for enabling the network stack to generate the data packet comprising the plurality of data payload portions based on the packet modification specification.

14. The method of claim 11, wherein the particular attributes for a data payload portion of the data packet include a priority level of the data payload portion.

15. The method of claim 11, further comprising providing conditions to intermediary network nodes that specify when the intermediary network nodes can perform the packet modification operation on the data packet.

16. The method of claim 11, further comprising performing, by a network stack of the source node, encryption on each individual data payload portion of the data packet.

17. The method of claim 11, further comprising performing, by a network stack of the source node, a cyclic redundancy check (CRC) on each individual data payload portion of the data packet.

18. The method of claim 11, further comprising providing an offset of each data payload portion of the data packet.

19. The method of claim 15, wherein the conditions that specify when intermediary network nodes can perform the packet modification operation on the data packet include a network congestion level.

20. The method of claim 15, wherein the conditions that specify when intermediary network nodes can perform the packet modification operation on the data packet include a buffer threshold level.

21. The method of claim 11, wherein the packet modification operation reduces the size of the data packet by removing at least one data payload portion of information from the data packet, wherein the at least one data payload portion of information selected for removal is based on the particular attributes assigned to the plurality of data payload portions of the data packet.

22. The method of claim 11, wherein the source node indicates that the data packet supports the packet modification operation by inserting the packet modification specification into the data packet.

23. A method, performed by a destination node, comprising:
receiving, by the destination node, a data packet that supports a packet modification operation;

extracting a payload and a packet modification specification from the data packet;

determining, by the destination node, whether the packet modification operation was performed on the data packet by an intermediary network node using the packet modification specification;

determining, by the destination node, whether to request retransmission of the data packet based on the extracted payload and the packet modification specification; and transmitting a request to a source node to retransmit the data packet only in response to a determination that the data packet is missing a data payload portion that is categorized as being significant.

* * * * *